W. W. McCAIN.
GEARLESS DIFFERENTIAL.
APPLICATION FILED NOV. 27, 1918.
1,313,396.
Patented Aug. 19, 1919.
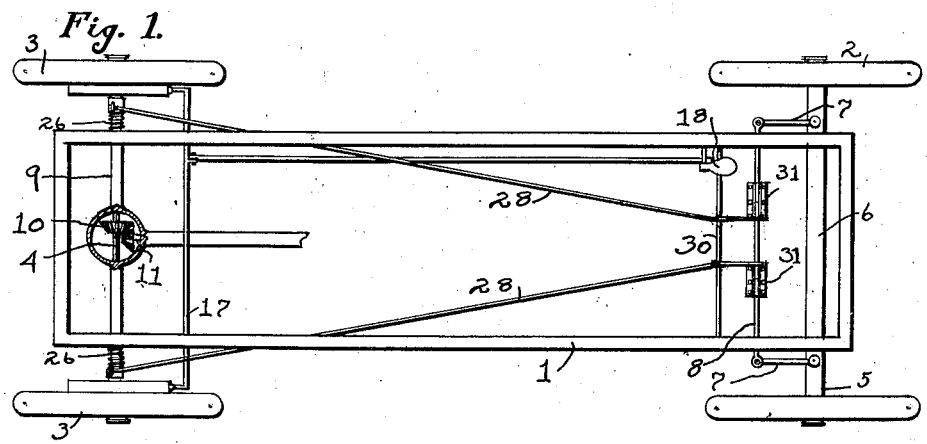
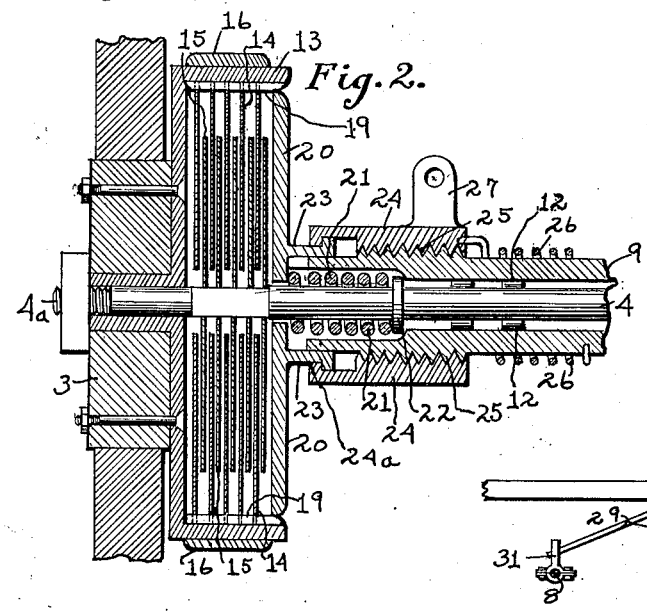
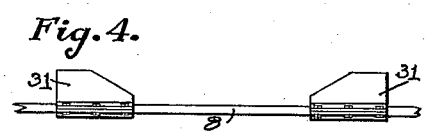
Inventor
WALTER W. McCAIN.
By N. S. Hill
Attorney

UNITED STATES PATENT OFFICE.

WALTER W. McCAIN, OF OGDEN, UTAH.

GEARLESS DIFFERENTIAL.

1,313,396.   Specification of Letters Patent.   Patented Aug. 19, 1919.

Application filed November 27, 1918. Serial No. 264,364.

*To all whom it may concern:*

Be it known that I, WALTER W. MCCAIN, a citizen of the United States, residing at Ogden, in the county of Weber, State of Utah, have invented a new and useful Gearless Differential; and I do hereby declare the following to be a full, clear, and exact, description of the invention, such as will enable others skilled in the art to which it appertains to make and use the same.

The present invention relates to a gearless differential for motor vehicles, and has for its objects to provide a device of this character which embodies novel features of construction whereby the drive wheels have independent clutch connections with opposite ends of a one-piece drive axle, the clutch connections being controlled automatically by the steering gear so that one of the clutches is opened and the corresponding wheel permitted to turn freely upon the axle when a turn is made in either direction.

Further objects of the invention are to provide a device of this character which can be manufactured at less cost than the complicated differential gearings which are now in common use, which compensates in the necessary manner when making a sharp turn in either direction, although the drive wheels are ordinarily locked together so that they turn in unison and even traction is obtained, and which eliminates the annoyance which is frequently occasioned by the spinning of one of the drive wheels when it gets caught in a mud hole with the other wheel on solid ground.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of the running gear of a motor vehicle provided with a gearless differential constructed in accordance with the present invention, portions being broken away and shown in section.

Fig. 2 is an enlarged sectional view through one of the multiple disk clutches.

Fig. 3 is a detail view of the cam means on the steering gear and the levers actuated thereby for automatically controlling the clutches.

Fig. 4 is a detail view of the steering rod and cam plates.

Corresponding and like parts are referred to in the following description and indicated in all of the views of the drawings by the same reference characters.

Referring to the drawings, which illustrate one possible embodiment of the invention, the numeral 1 designates the main frame of a motor vehicle, the numerals 2 the front wheels which are mounted to swing for steering purposes, and the numerals 3 the rear wheels which are driven from a one-piece rear axle 4. The front wheels 2 are mounted in the usual manner upon stub axles 5 which are pivotally connected to the ends of the front axle 6, and provided with rearwardly extended arms 7, said arms being connected by the transverse steering rod 8 so that the front wheels will always turn in unison. Any conventional form of steering gear may be utilized for turning the front wheels.

The rear axle 4 extends through a rear axle housing 9 and is connected at its middle portion by bevel gearing 10 to the rear end of the drive shaft 11 which receives power from the conventional power plant. The usual anti-friction bearings 12 are provided within the axle housing 9 for supporting the rear axle so that it will rotate freely. The rear wheels 3 of the motor vehicle are loose upon the spindles 4ª at the ends of the axle, and each of the wheels has a hollow clutch shell 13 rigidly connected thereto. The complemental plates 14 and 15 of a multiple disk clutch are arranged within each of the shells 13, while the exterior of each of the shells is surrounded by a brake band 16. These brake bands are operatively connected to a rock shaft 17 which is in turn operatively connected in the usual manner to a foot pedal 18, this brake mechanism being of the conventional construction and being operated in the usual manner when driving the vehicle.

The plates 14 of each of the clutches are carried by the shell 13 thereof, having the usual key connection 19 at their outer peripheries with the interior of the shell, so that they are rotatable with the shell but are movable freely toward and away from each other. The complemental clutch plates 15 are disposed alternately with respect to the clutch plates 14, being rotatable with the axle 4, and being preferably formed with polygonal or square openings which fit over a correspondingly shaped portion of the axle. A clutch controlling plate 20 which is slidable upon the axle normally forces the clutch plates of each disk into a tight frictional engagement with each other. A coil spring 21 which surrounds the axle is interposed between each of the clutch control plates 20 and a collar 22, the tension of the spring normally forcing the plate into operative position and closing the clutch, thereby locking the wheel rigidly with the axle. Each of the control plates 20 is provided with a flanged hub portion 23 which is loosely engaged by the reversely disposed flanged end 24ª of a clutch shifting collar 24, said collar having a threaded engagement 25 with the axle housing. The pitch of these threads is comparatively sharp so that the fraction of a turn is sufficient to move the collar 24 longitudinally enough to open the clutch. A spring 26 normally rotates the collar into operative position, and an arm 27 which projects from the collar provides a means for rotating the collar against the action of the spring to pull the clutch control plate 20 outwardly and open the clutch. The corresponding rear wheel 3 is thus permitted to turn freely upon the end of the axle, although as soon as the collar 24 is released it is returned to operative position by the spring 26.

The arms 27 of the two clutch controlling collars 24 are connected by forwardly extending pull rods 28 to bell crank levers 29 which are mounted upon a transverse shaft 30, said shaft extending across the main frame 1 at a point slightly to the rear of the front axle 6. One of the arms of each of the bell crank levers 29 projects over the steering rod 8 into the path of a cam plate 31 which is rigidly secured thereto. These cam plates 31 are adjustable, being arranged so that they will only be brought into operative engagement with the respective clutch releasing levers 29 when an appreciable turn is made. Both of the rear wheels 3 are thus locked with the rear axle so that an even traction is obtained when driving straight ahead, and it is not necessary to release either of the rear wheels for a slight turn such as is incident to following the road or passing another vehicle. However, when a turn of sufficient degree to necessitate compensation is made, one of the cam plates 31 is brought into engagement with a corresponding bell crank lever 29 and swings the same to pull the rod 28 and turn the collar 24 of the corresponding clutch, with the result that the clutch is opened and the corresponding rear wheel permitted to turn freely upon the axle. Preferably the mechanism is arranged to release the inside wheel, thereby causing all of the driving power of the machine to be concentrated upon the outside wheel. As soon as the turn has been made and the steering wheels are straightened out, the cam plates 31 are disengaged from the levers 29 and both of the drive wheels again locked with the drive axle.

Having thus described the invention, what I claim as new and desire to secure by Letters Patent, is:—

1. In a motor vehicle, the combination with steering wheels and steering gear including a transversely movable connecting rod, a one-piece drive axle, drive wheels loose upon the ends of the drive axle, independent clutches between the drive wheels and the axle, cam plates adjustably clamped upon the steering gear connecting rod, levers mounted upon the vehicle and each arranged with one arm projecting into the path of one of the cam plates, and a pull rod between the opposite end of each of the levers and the corresponding clutch.

2. In a motor vehicle, the combination with steering wheels and steering gear including a transversely movable connecting rod, a one-piece drive axle, drive wheels loose thereon, independent clutches between the drive wheels and the axle, an axle housing, collars threaded upon the axle housing and operatively connected to the clutches, and means actuated by the movements of the steering gear connecting rod for selectively rotating the collars to open one of the clutches when a turn is made in either direction.

3. In a motor vehicle, the combination with steering wheels and steering gear including a transversely movable connecting rod, a one-piece drive axle, drive wheels loose thereon, independent clutches between the drive wheels and the axle, an axle housing, collars threaded on the axle housing and operatively connected to the clutches, arms projecting from the collars, cam members upon the steering gear connecting rod, levers arranged to be actuated by the cam members, and pull rods between the levers and the arms of the collars.

4. In a motor vehicle, the combination with steering wheels and steering gear including a transversely movable connecting rod, a one-piece drive axle, drive wheels loose upon the axle and provided with clutch shells, multiple disk clutches within the shells, an axle housing, collars threaded upon the axle housing and having an operative connection with the respective multiple disk clutches, arms projecting from the collars, cam plates applied to the steering gear connecting rod, a pair of levers pivotally mounted between their ends and each having one arm projecting into the path of one of the cam plates, and pull rods between the opposite ends of the levers and the arms of the corresponding clutch controlled collars.

In testimony whereof I have signed my name to this specification in the presence of two subscribing witnesses.

WALTER W. McCAIN.

Witnesses:
JESSE FOWERS,
J. A. McCULLOCH.